United States Patent [19]

Iwamoto et al.

[11] Patent Number: 5,191,023
[45] Date of Patent: Mar. 2, 1993

[54] BLOCK-COPOLYMERIZED-RUBBER-MODIFIED STYRENE COPOLYMERS

[75] Inventors: Mune Iwamoto, Osaka; Norifumi Ito, Kanagawa; Tetsuyuki Matsubara, Kanagawa; Kazuo Sugazaki, Kanagawa; Toshihiko Ando, Kanagawa, all of Japan

[73] Assignee: Mitsui Toatsu Chemicals, Inc., Tokyo, Japan

[21] Appl. No.: 726,951

[22] Filed: Jul. 8, 1991

Related U.S. Application Data

[63] Continuation of Ser. No. 392,896, Aug. 14, 1989, abandoned.

[30] Foreign Application Priority Data

Aug. 26, 1988 [JP]  Japan ............................ 210597/1988

[51] Int. Cl.$^5$ .................... C08F 297/04; C08L 53/02
[52] U.S. Cl. ..................................... 525/314; 525/53; 525/92; 525/93; 525/94; 525/95; 525/96; 525/99; 525/282; 525/310; 525/316
[58] Field of Search ............... 525/243, 314, 282, 310, 525/316

[56] References Cited

U.S. PATENT DOCUMENTS

| | | | |
|---|---|---|---|
| 3,600,467 | 8/1971 | Darcy et al. | 525/314 |
| 4,144,204 | 3/1979 | Mittnacht et al. | 525/315 |
| 4,407,979 | 10/1983 | DiGiulio | 521/59 |
| 4,430,449 | 2/1984 | DiGiulio | 525/314 |
| 4,600,747 | 7/1986 | Zabrocki et al. | 525/83 |

FOREIGN PATENT DOCUMENTS

| | | |
|---|---|---|
| 160974 | 11/1985 | European Pat. Off. |
| 3505749 | 2/1985 | Fed. Rep. of Germany |
| 58-4934 | 1/1983 | Japan |
| 1175126 | 12/1969 | United Kingdom |

*Primary Examiner*—James J. Seidleck
*Assistant Examiner*—Vasu S. Jagannathon
*Attorney, Agent, or Firm*—Burns, Doane, Swecker & Mathis

[57] ABSTRACT

The present invention relates to rubber-modified styrene copolymer that exhibits excellent rigidity, impact strength, external appearance and fluidity, while retaining rigidity, impact properties and external appearance, and when prepared by copolymerizing a maleimide monomer, has high heat resistance and therefore is suitable for materials for components of electric equipments, electronic equipments, automobiles and business machines.

31 Claims, 1 Drawing Sheet

BLOCK-COPOLYMERIZED-RUBBER-MODIFIED STYRENE COPOLYMERS

This application is a continuation of application Ser. No. 07/392,896, filed Aug. 14, 1989, now abandoned.

BACKGROUND of the INVENTION a) Field of the Invention

The present invention relates to molding resins, specifically to rubber-modified styrene copolymers that exhibit excellent external appearance, rigidity, impact strength and moldability. More specifically, the present invention relates to styrene copolymers modified by block copolymerized rubber having a star like radial structure.

b) Description of the Prior Art

Rubber-modified styrene copolymers are well known that are prepared by polymerizing a monomer such as styrene, in which a rubbery polymer is dissolved, and which consist of dispersed phases and a continuous phase. Such copolymers have been used extensively as molding materials, for example, in components of electrical equipment, automobiles and the like. Due to the increased applications for such copolymers, the external appearance of the molded articles has gained importance. Further, rigidity and improved impact strength for machine components is strongly desired. Rigidity improves with lower rubber content, however at lower rubber contents, impact strength decreases. Therefore it is desirable to improve and balance both rigidity and impact strength. In addition, high gloss or a matte appearance may be desired for some applications.

On the other hand, a demand for higher precision molding and improved molding cycles lead to a demand for resin materials having high fluidity. Usually, in high fluidization of resin materials (1) decreased molecular weight and decreased rubber content or (2) addition of plasticizers for high fluidization is effective. However, impact strength decreases when the molecular weight and rubber content are decreased and heat resistance or rigidity decreases when plasticizers are added. Thus, it is desirable to improve fluidity and achieve a balance with impact strength, heat resistance and rigidity.

Japanese Patent Publication No. 58-4934 discloses the use of a specific rubbery polymer. Although several proposals have been made to improve gloss, rigidity, external appearance of molded articles, impact strength of such rubber-modified styrene polymers, fluidity, and further improvements are desired. U.S. Pat. No. 4,421,895 discloses the use of a particular organic peroxide in a specific amount, a specific rubbery polymer and a solvent to control the particle size of the rubbery polymer. However, this patent does not address the problem that properties such as gloss, rigidity, external appearance, impact strength and fluidity must be both maintained at a high level and be well-balanced.

SUMMARY OF THE INVENTION

The present invention overcomes the problems and disadvantages of the prior art by providing rubber-modified styrene copolymers that exhibit excellent external appearance, rigidity, impact strength and moldability.

It is an object of the present invention to provide a rubber-modified styrene copolymer prepared by polymerizing a styrene monomer and an acrylonitrile monomer in which a rubbery polymer is dissolved, and which comprises dispersed phases and a continuous phase and exhibits improved properties overall including gloss, rigidity, external appearance of molded articles, impact strength and fluidity. It is a further object of the present invention to provide a rubber-modified styrene copolymer having further improved heat resistance by replacing a portion of the total amount of the styrene monomer and acrylonitrile monomer with a maleimide monomer.

The objects and advantages of the invention will be set forth in part in the description which follows, and in part will be obvious from the description, or may be learned by practice of the invention. The objects and advantages of the invention will be realized and attained by means of the instrumetalities and combinations, particularly pointed out in the appended claims.

To achieve the objects and in accordance with the purpose of the invention as embodied and broadly described herein the invention provides a rubber-modified styrene copolymer prepared by polymerizing an aromatic vinyl monomer like styrene (referred to as a styrene type monomer hereinafter) and a vinyl cyanide monomer like acrylonitrile (referred to as an acrylonitrile type monomer hereinafter) in the presence of a rubbery polymer (abbreviated as "RMSCO" hereinafter), said rubber-modified styrene copolymer comprising a block copolymer containing a polymer block containing at least one butadiene type momomer (BDB) and polymer block containing at least one styrene type monomer (STB), when said block copolymer constitutes at least 50 wt % of the rubbery polymer and has a styrene type monomer content of from about 2 to about 30 wt % and a star like radial structure, represented by the formula $(BDB-STB)_m P$ wherein m is an integer of from 3 to 6, and P is a moiety of a multi-functional coupling agent, and wherein the styrene-insoluble content at 25° C. of the rubbery polymer is about 0.5 wt % or less, and the viscosity as measured at 25° C. in the form of a 5 wt % styrene solution is from about 5 to 50 centistokes:

The RMSCO comprises dispersed particles of the rubbery polymer and a continuous phase of a copolymer of the styrene type monomer and the acrylonitrile type monomer (hereinafter abbreviated as SACO). The dispersed particles contain the SACO in a grafted or occluded form with a SACO occlusion and graft index of 25–150%. The molecular weight distribution index of the SACO is in the range of from about 1.9 to about 3.0.

BRIEF DESCRIPTION OF THE DRAWINGS

FIG. 1 (b) is a plan view of the molded article. The letter G indicates the position of a gate.

DETAILED DESCRIPTION OF THE INVENTION

Figure 1A:
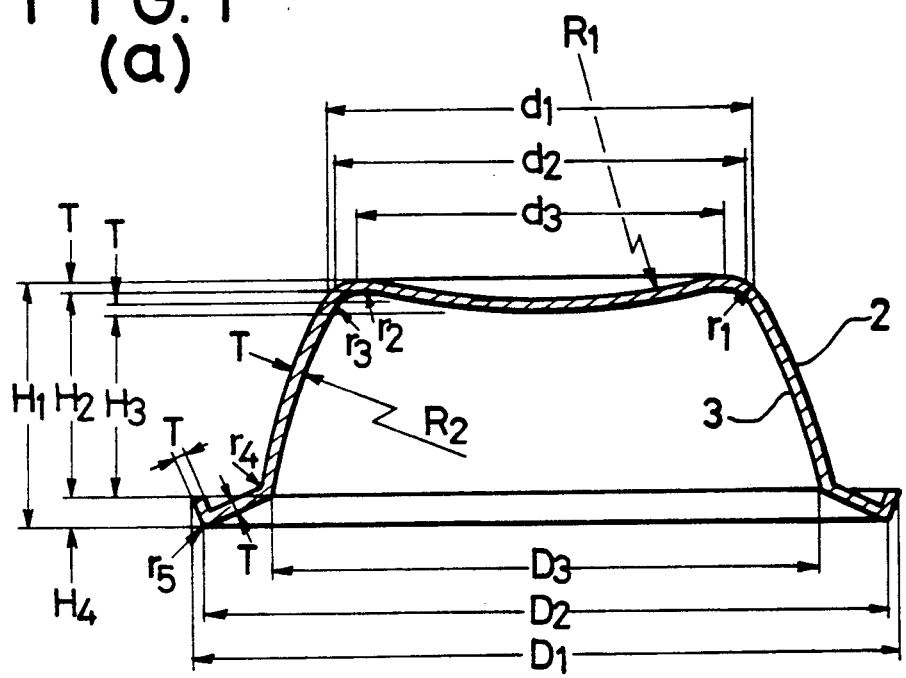
FIGS. 1 (a) is a cross-sectional view of a molded article employed in a practical impact test.

Reference will now be made in detail to the preferred embodiments of the invention. The rubber-modified styrene copolymer of the invention may be prepared by bulk or solution polymerization of a styrene type monomer and an acrylonitrile type monomer in which a rubbery polymer is uniformly dissolved thus forming dispersed particles, followed by additional polymerization. The copolymer of the invention is distinct from a resin obtained when a styrene type monomer and an acrylonitrile type monomer are added to a rubber latex by emulsion polymerization to from a mixture which is then subjected to polymerization.

The rubber-modified styrene copolymer comprises one continuous phase and several dispersed phases, each phase being composed of a polymer consisting of two or more monomers. When observed on an electron micrograph, the dispersed phases appear as islets whereas the continuous phase appears as a uniform phase. The continuous phase may be dissolved with a 7:3 mixed solvent of methyl ethyl ketone and methanol. On the other hand, the dispersed phases are not dissolved by the mixed solvent.

When the copolymer of the present invention is produced by bulk or solution polymerization, no particular limitation is imposed on the process. The copolymer may preferably be produced, for example, by continuous bulk polymerization. As an example of such a production process, the rubbery polymer may be charged into a liquid mixture containing the styrene type monomer and the acrylonitrile type monomer, and dissolved with stirring, preferably by controlling the temperature at from about 20° to about 70° C. The solution is then polymerized in a reactor having at least a single stage, preferably, two or more stages, equipped with a stirrer. From the final stage of polymerization, the copolymer is obtained by a removal step for volatile components in which solid components and volatile components such as unreacted monomers and solvent are separated from each other. In the above process, the rubbery polymer which is dissolved in the solution containing the monomers is fed to the first-stage polymerizer. On the other hand, the monomers, a polymerization initiator and a chain transfer agent are supplied to the reactor at a desired stage.

In the preferred embodiments of the present invention, the copolymer is prepared by bulk or solution polymerization. It is not possible to produce the copolymer of the invention by either emulsion polymerization or suspension polymerization since a latex rubber is used in emulsion polymerization. Further, formation of dispersed phases of the rubbery polymer is very difficult in suspension polymerization processes.

In the present invention, the amount of the rubbery polymer in the RMSCO is preferably at least about 2 parts by weight per 100 parts by weight RMSCO. A copolymer containing less than about 2 parts by weight of the rubbery polymer has low impact strength, and can not attain well-balanced properties which the present invention is designed to achieve.

A block copolymer comprising a polymer block containing at least one butadiene type monomer (BDB) and another polymer block containing at least one styrene type monomer (STB) is present in said rubbery polymer in an amount of from about at least 50 wt %, preferably 70 wt % of the rubbery polymer. The styrene type monomer content of said block copolymer is from about 2 to about 30 wt %, preferably from about 3 to about 20 wt %, more preferably from about 3 to about 10 wt %. The block copolymer has a star like radial structure represented by the formula $(BDB-STB_m)P$ wherein m is an integer from 3 to 6 and P is a moiety of a multifunctional coupling agent. The amount of styrene-insoluble components of said rubbery polymer at 25° C. is about 0.5 wt % or less, preferably about 0.05 wt % or less. In addition, the viscosity measured at 25° C. in the form of a 5 wt % styrene solution is from about 5 to about 50 centistokes, preferably from about 8 to about 40 centistokes. Exemplary block copolymers present in the copolymer of the invention include a polymer block BDB prepared by copolymerizing less than about 10 parts by weight, preferably less than about 5 parts by weight of a styrene type component per about 100 parts by weight of a polymer block BDB. Similarly, polymer block STB prepared by copolymerizing less than about 10 parts by weight of a butadiene type component per about 100 parts by weight of STB are also included in the present invention. Also included are copolymer compositions in the vicinity of the junction of the BDB block and the STB block in which the butadiene type component gradually decreases while the styrene type component gradually increases. If the rubbery polymer contains greater than about 0.5 wt % styrene-insoluble components, RMSCO result in molded articles of deteriorated external appearance and development of fish eyes and mottles. Neither RMSCO prepared by using the rubbery polymer having a viscosity of less than 5 centistokes as measured at 25° C. in the form of a 5 wt % styrene solution nor RMSCO prepared by using the rubbery polymer having a viscosity of more than 50 centistokes as measured in the same manner can exhibit the characteristics achieved by the RMSCO of the present invention.

In the RMSCO of the present invention, the rubbery polymer contains the SACO in an occluded or grafted form and the SACO occlusion and graft index is from about 25 to about 150%, preferably from about 25 to about 100%, more preferably from about 25 to about 90%, and most preferably from about 25 to about 80%.

The SACO occlusion and graft index is determined in the following manner. A gram (g) of the copolymer (about 1 gram is weighed precisely) is dispersed in 30 cc of a 7:3 mixed solvent of methyl ethyl ketone and methanol; insoluble matter is separated by centrifugation and dried; the weight (b g) of the insoluble matter is weighed precisely, and the index y is calculated by the following equation:

$$y (\%) = \left\{ \frac{b}{a} - 1 \right\} \times 100$$

Such a value y may be controlled, by the polymerization initiator, the intensity of stirring, the kinds and amounts of the rubbery polymer to be used, the amounts and kinds of the monomers, the molecular weight regulator, the final polymerization degree, and the conditions for the removal step for volatile components. In general, the value y tends to increase as the amount of polymerization initiator increases, the intensity of stirring decreases, the diene moieties of the rubbery polymer increases, the proportion of the rubbery polymer decreases, the proportion of the styrene type monomer increases, or the temperature of the removal step for volatile components increases. A person skilled in the art can achieve a desired SACO occlusion value and grafting index value by controlling such parameters in accordance with a trial and error method. When additives such as a pigment, a metal soap, and the like are added to the RMSCO, the values obtained by subtracting the weight of the additive from the values a, b are used as a and b set forth above.

In the RMSCO of the present invention, the reduced viscosity of the SACO in the continuous phase as measured at 30° C. as a 0.5 wt % dimethylformamide (DMF) solution is preferably from about 0.5 to about 1.0 dl/g, more preferably from about 0.6 to about 0.9 dl/g, most preferably from about 0.6 to about 0.85 dl/g. If the above value exceeds 1.0, the fluidity is extremely deteriorated. Any values smaller than 0.5 lead to a reduction in impact strength. Reduced viscosity is determined in the following manner. The RMSCO is dispersed in a 7:3 mixed solvent of methyl ethyl ketone and methanol; any components insoluble in the mixed solvent are removed by centrifugation. Then the solvent containing soluble components is poured into about 20 times its volume in methanol so as to reprecipitate the soluble components. The precipitates are filtered, dried, and then the reduced viscosity is measured using dimethylformamide.

The molecular weight distribution index by Gel Permeation Chromatography method ( GPC method ) of the SACO in the continuous phase of the RMSCO of the present invention should be from about 1.9 to about 3.0, more preferably from about 2.3 to about 2.8. The molecular weight distribution index is a value of weight-average molecular weight/ number-average molecular weight. Polymers having a molecular weight smaller than 1,000 are excluded upon measurement. Such molecular weight distribution may be preferably attained by continuous bulk or solution polymerization. More preferably, the molecular weight distribution may be attained by controlling the final conversion degree of polymerization below 80%, preferably below 70%, and removing the monomers from the polymerization solution at the final stage of polymerization. It is important to limit the molecular weight index in order to retain high fluidity.

In the present invention, the dispersed phases comprise the rubbery polymer containing the copolymer of the styrene type monomer and acrylonitrile type monomer in an occluded form or in a grafted form. The average particle size of the rubbery polymer particles is from about 0.1 to about 3.0 μm, preferably from about 0.15 to about 1.7 μm, more preferably from about 0.2 to about 1.3 μm, most preferably from about 0.23 to about 1.1 μm.

The average particle size x of the rubbery polymer particles is measured in the following manner. An electron micrograph of the resin is taken by the ultrathin slice technique. The particle sizes of from about 500 to about 700 rubbery polymer particles in the micrograph are measured and then averaged in accordance with the following equation.

$$\text{average particle size} \times (\mu m) = \Sigma nD^4/nD^3$$

wherein n denotes the total number of the rubber particles having D μm particle size.

The particle size distribution coefficient of the rubbery polymer particles ( Dd ) is calculated in the following manner after determining $x_2$.

$$x_2 (\mu m) = \Sigma nD^3/nD^2$$

$$Dd = x/x_2$$

A preferred Dd is from about 1.05 to about 2.0 more preferably from about 1.1 to about 1.5.

In the RMSCO of the present invention, the crosslinking index of the dispersed phases is preferably from about 4 to about 15 times, more preferably from about 6 to about 13 times, most preferably from about 7 to about 12 times. The crosslinking index of such dispersed phases can be determined by the following method. In 30 cc of a 7:3 mixed solvent of toluene and methyl ethyl ketone, 0.4 g of copolymer is partially dissolved. After centrifugation, the weight of an insoluble matter swollen with the solvent is measured ($w_1$). After the weighing, the insoluble matter is dried in vacuo and is weighed again ($w_2$). The crosslinking index is given by $w_1/w_2$. Such crosslinking index is dependent on the amount and the kind of the polymerization initiator and the temperature and the residence time at the removal step for the volatile components. It also depends on the amount of a maleimide type monomer. A suitable crosslinking index can be set by a person skilled in the art by choosing appropriate conditions for the production process in accordance with the trial and error method. If the crosslinking index is smaller than about 4, the impact strength is extremely low and fluidity is also low. On the other hand, any crosslinking index greater than about 15 results in lower practical impact strength.

Exemplary suitable "styrene type monomers" for use in the invention include styrene, side chain alkyl-substituted styrenes such as α-methylstyrene and α-ethylstyrene, nucleus alkyl-substituted styrenes such as monochlorostyrene, dichlorostyrene, vinyltoluene, vinylxylene, o-t-butylstyrene, p-t-butylstyrene and p-methylstyrene, halogenated styrenes such as tribromostyrene and tetrabromostyrene, p-hydroxystyrene, o-methoxystyrene, and vinylnaphthalene. Particularly preferred are styrene and α-methylstyrene. Such styrene type monomers may be used either singly or in combination.

Exemplary suitable "acrylonitrile type monomers" for use in the invention include acrylonitrile, methacrylonitrile, fumaronitrile, maleonitrile, α-chloroacrylonitrile and the like. Acrylonitrile is particularly preferred. Such monomers may be used either singly or in combination.

Applicants have also discovered that to improve heat resistance, a portion of either one or both of the styrene type monomer and acrylonitrile type monomer components of the copolymer may be replaced with one or more of methacrylic ester monomers such as methyl methacrylate, acrylic ester monomers such as methyl acrylate, maleimide monomers such as maleimide and N-phenylmaleimide to an extent of not more than about 30 wt % of the sum of the styrene type monomer and acrylonitrile type monomer. To improve the heat resistance, either one or both of the styrene type monomer and acrylonitrile type monomer component are replaced by from about 1 to about 30 wt % of a maleimide type monomer more preferably by from about 5 to about 17 wt % of a maleimide type monomer.

The -composition of the SACO forming the continuous phase of the RMSCO of the present invention is preferably from about 95/5 to about 55/45 by weight styrene type monomer/acrylonitrile type monomer.

The copolymer of the present invention may be combined with a conventional antioxidant such as hindered phenolic antioxidant, phosphorus based antioxidant or sulphur-based antioxidant to improve the heat stability, or with a lubricant to further improve the fluidity. It is also possible to incorporate a fibrous reinforcing agent such as glass fibers, an inorganic filler, a colorant and/or a pigment with the copolymer of the present invention, depending on the intended end use thereof. It is also possible to impart flame retardancy to the resin composition comprising the copolymer of the present invention by adding a conventional flame retardant such as a halogenated organic compound, for example, tetrabromobisphenol A, decabromobiphenyl ether or brominated polycarbonate, along with antimony oxide.

The RMSCO of the present invention may be molded after being blended with one or more resins such as ABS resin, polyvinyl chloride, styrene-acrylonitrile resin, polycarbonate, polybutylene terephthalate, polyethylene terephthalate, nylon 6, nylon 66, nylon 12, polyphenylene oxide and polyphenylene sulfide.

EXAMPLES

The present invention will be further clarified by the following Examples, which are intended to be purely exemplary of the invention.

EXAMPLE 1

A. Production of RMSCO

A rubber-modified styrene copolymer was prepared using a continuous bulk polymerization apparatus constructed of four stirrer-equipped reactors connected in series and a preheater and a vacuum tank connected successively to an outlet of the fourth reactor. Eight wt % of the rubbery polymer 1 shown in Table 1 was poured into a mixed solution of 50 wt % styrene, 16.9 wt % acrylonitrile and 25 wt % ethylbenzene. The mixture was stirred at 50° C. for 7 hours to form a uniform rubber solution. The rubber solution was continuously charged into the first reactor for polymerization. After passing through the fourth reactor, the reaction mixture was flowed through a preheater which was maintained at a temperature of from about 230° to about 250° C.; the unreacted monomers and solvent were removed into a vacuum tank operating at 50 torr, and the resultant resin was continuously drawn out of the vacuum tank. The RMSCO was obtained. An organic peroxide (300 ppm) was used as a polymerization initiator and dodecyl mercaptan was employed as a molecular weight regulator. The amount of the rubbery polymer in the copolymer was calculated at 17 wt % from the feed amounts of the charged raw materials and the amount of the obtained copolymer produced. The stirring speed of the first reactor was set at 180 rpm.

B. Analysis of RMSCO
- B-1. Rubber content: The content of rubber was determined from the balance of the amount charged and the amount drawn out as described in A.
- B-2. Morphology analysis: Formation of a continuous phase and dispersed phases was observed on an electron micrograph. The particle size in the dispersed phases and the particle size distribution coefficient Dd were determined by the method described in the Detailed Description of the Invention section.
- B-3. SACO occlusion and graft coefficient: The method described above was followed.
- B-4. Crosslinking index: The method described above was followed.
- B-5. Molecular weight distribution index: The method described above was followed.

C. Evaluation of physical properties:

C-1. Molding

After drying a resultant copolymer at 80° C. for 3 hours, the copolymer was molded by an injection molding machine at a molding temperature of 230° C. and a mold temperature of 40° C.

C-2. Evaluation (1) Rigidity: Evaluated by tensile strength in accordance with JIS K-7113.

(2) Hardness: Rockwell hardness was measured with R scale in accordance with JIS K-7202.

(3) Izod impact strength: Evaluated in accordance with JIS K-7110.

(4) Gloss: Evaluated in accordance with JIS K-7105.

Figure 1B:
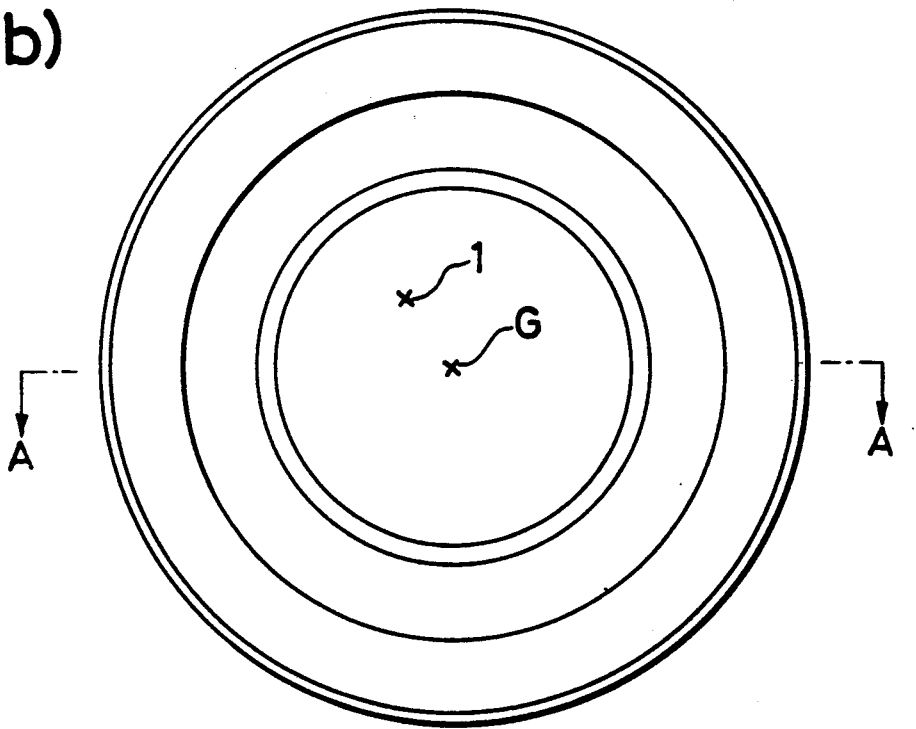

(5) Evaluation of practical impact strength: A dart impact strength test was performed on 3 portions cut out at Location 1, Location 2 and Location 3 from a molded article obtained by injection molding and having a shape shown in FIG. 1. The Radius (R) of a tip portion of the dart was 6.4 mm (R=6.4 mm), while inner diameter of a base was 25 mm. Location 1 is around the gate, Location 2 is close to a corner, and Location 3 is a standard location. The sizes indicated by the following symbols and numbers in FIG. 1 are as below.

$D_1 = 128.0$ mm $\phi$   $D_2 = 126.0$ mm $\phi$ $D_3 = 101.6$ mm $\phi$   $d_1 = 75.9$ mm $\phi$ $d_2 = 74.0$ mm $\phi$   $d_3 = 67.3$ mm $\phi$ $H_1 = 42.0$ mm   $H_2 = 37.0$ mm $H_3 = 34.0$ mm   $H_4 = 3.5$ mm $R_1 = 190.0$ mm   $R_2 = 160.0$ mm $r_1 = 2.0$ mm   $r_2 = 3.0$ mm $r_3 = 3.0$ mm   $r_4 = 1.0$ mm $r_5 = 0.5$ mm $T = 1.5$ mm (6) Moldability: Evaluated by the hydraulic pressure of a molding machine at which short shot is developed in injection molding. Namely, the higher the hydraulic pressure is, the poorer the moldability is.

(7) Heat resistance: Evaluated by Vicat softening point in accordance with ASTM D 1525.

D. Results

The results are shown in Table 2. The RMSCO obtained in Example 1 has excellent rigidity, hardness, Izod impact strength, practical impact strength and gloss, and also has significantly decreased marks near the gate.

Comparative Example 1

The experiment was performed in the same manner as in Example 1 except that a rubbery polymer 2 shown in Table 1 replaced the rubbery polymer 1 in preparation of the copolymer. The results are shown in Table 2. The RMSCO obtained had properties inferior to Example 1.

Comparative Example 2

The experiment was performed in the same manner as in Example 1 except that a rubbery polymer 3 shown in Table 1 replaced the rubbery polymer 1 in preparation of the copolymer. The results are shown in Table 2. The RMSCO had extremely inferior properties.

Comparative Example 3

The copolymer was prepared by an emulsion polymerization method quite different from the method of the present invention. The copolymer was obtained by conducting polymerization while continuously adding styrene and acrylonitrile into polybutadiene rubber latex (solids content: 30%). Evaluation was performed in the same manner as in Example 1. Izod impact strength and practical impact strength were low, and other properties were also inferior to Example 1.

EXAMPLE 2

N-phenylmaleimide dissolved in ethylbenzene was continuously fed to the first reactor of the four stirring reactors in Example 1 in an amount corresponding to 65% of the rubbery polymer charged and also to the second reactor in an amount corresponding to 23%. The reaction rate at the outlet of the fourth reactor was adjusted to be roughly the same as in Example 1 by lowering the reaction temperatures in the third and fourth reactors. The thus obtained RMSCO had high heat resistance. A commercially available high-temperature ABS resin prepared by copolymerizing α-methylstyrene in emulsion polymerization was molded and evaluated for comparison.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

TABLE 1

| | Rubbery Polymer 1 | Rubbery Polymer 2 | Rubbery Polymer 3 |
|---|---|---|---|
| Structure of Rubbery Polymer | Block Copolymer Represented by the Formula (BDB-STB)$_m$P m = 4 (containing about 20% of BDB-STB block copolymer) | Polybutadiene | Polybutadiene |
| Styrene Content in Rubbery Polymer by Block Copolymerization | 10% | — | — |
| Microstructure of Polybutadiene Portion | cis 30% vinyl 18% | cis 31% vinyl 20% | cis 96% vinyl 0.5% |
| Styrene-insoluble Components at 25° C. | 0.03% | 0.02% | 0.01% |
| 5 wt % Styrene Solution Viscosity at 25° C. | 29 centistokes | 33 centistokes | 20 centistokes |

TABLE 2

| | | Unit | Example 1 | Comparative Example 1 | Comparative Example 2 | Comparative Example 3 | Example 2 | Example of Reference 1 |
|---|---|---|---|---|---|---|---|---|
| Structure of RMSCO | Kind of Rubbery Polymer | — | 1 | 2 | 3 | — | 1 | — |
| | Rubber Content in RMSCO | % | 17 | 17 | 17 | Emulsion Polymerization 17 | 17 | — |
| | SACO Occlusion and Graft Index | % | 55 | 70 | 20 | 15 | 65 | — |
| | Particle Size in Dispersed Phases | μm | 0.4 | 0.45 | 1.2 | 0.3 | 0.6 | — |
| | Distribution Coefficient of Particles in Dispersed Phases Dd | — | 1.2 | 1.3 | 1.8 | 1.1 | 1.2 | — |
| | SACO Composition  Acrylonitrile | wt % | 25 | 25 | 25 | 25 | 21 | — |
| | Styrene | wt % | 75 | 75 | 75 | 75 | 64 | — |
| | N-Phenylmaleimide | wt % | — | — | — | — | 15 | — |
| | Molecular Weight Distribution Index of SACO | — | 2.3 | 2.4 | 2.5 | 3.5 | 2.7 | — |
| | Reduced Viscosity of SACO | dl/g | 0.61 | 0.62 | 0.61 | 0.59 | 0.61 | — |
| | Proportion of the SACO Whose Molecular Weight Exceeds 1,200,000 in SACO | Parts by weight | 0 | 0 | 0 | 2.1 | 0 | — |
| Properties of RMSCO | Moldability (Hydro. Press. of Short Shot) | Kg/cm² | 35 | 36 | 37 | 41 | 52 | 60 |
| | Rigidity | Kg/cm² | 510 | 500 | 420 | 510 | 520 | 520 |
| | Izod Impact Strength | Kg cm/cm | 23 | 18 | 10 | 17 | 20 | 18 |
| | Practical Impact Strength  Location (1) | Kg·cm | 20 | 15 | 17 | 10 | 18 | 10 |
| | Location (2) | Kg·cm | 40 | 25 | 25 | 15 | 27 | 15 |
| | Location (3) | Kg·cm | 42 | 41 | 30 | 25 | 40 | 20 |
| | Gloss | % | 92 | 90 | 70 | 92 | 80 | 80 |
| | Vicat Softening Point | °C. | 110 | 100 | 110 | 105 | 130 | 122 |

We claim:

1. A rubber-modified styrene copolymer prepared by polymerizing a monomer of styrene or its derivatives and a monomer of acrylonitrile or its derivatives in the presence of a rubbery polymer comprising:

a block copolymer comprising a first polymer block comprising at least one monomer of butadiene or its derivatives and a second polymer block comprising at least one monomer of styrene or its derivatives, said block copolymer constituting at least about 50 wt % of said rubbery polymer and having a monomer of styrene or its derivatives content of from about 3 to about 20 wt % and a starlike radial structure represented by the formula (BDB—STB$_m$P) wherein BDB denotes a polymer block comprising at least one monomer of butadiene or its derivatives, STB denotes a polymer block comprising at least one monomer of styrene or its derivatives, m is an integer of from 3 to 6 and P is a moiety of a multi-functional coupling agent, said rubbery polymer containing no greater than about 0.5 wt % styrene-insoluble components at 25° C. and having a viscosity of from about 5 to about 50 centistokes as measured at 25° C. in the form of a 5 wt % styrene solution; and said rubber-modified styrene copolymer comprising dispersed particles of said rubbery polymer and a continuous phase of a copolymer of said monomer of styrene or its derivatives and said monomer of acrylonitrile or its derivatives, wherein said dispersed particles contain a copolymer of said monomer of styrene or its derivatives and said monomer of acrylonitrile or its derivatives grafted or occluded and have a copolymer occlusion and graft index from about 25 to about 150%; and wherein the molecular weight distribution index of said copolymer of the monomer of styrene or its derivatives and said monomer of acrylonitrile or its derivatives is from about 1.9 to about 3.0.

2. The rubber-modified styrene copolymer of claim 1, wherein said rubbery polymer is first uniformly dissolved in said monomer of styrene or its derivatives and said monomer of acrylonitrile or its derivatives, and then a bulk polymerization process is carried out to form dispersed particles, which are further subjected to polymerization.

3. The rubber-modified styrene copolymer of claim 1, wherein said rubbery polymer is first uniformly dispersed in said monomer of styrene or its derivatives and said monomer of acrylonitrile or its derivatives, and then a solution polymerization process is carried out to form dispersed particles, which are further subjected to polymerization.

4. The rubber-modified styrene copolymer of claim 1, wherein said rubbery polymer is first uniformly dissolved in said monomer of styrene or its derivatives and said monomer of acrylonitrile or its derivatives, and then a continuous bulk polymerization is carried out to form dispersed particles, which are further subjected to polymerization.

5. The rubber-modified styrene copolymer of claim 1, wherein said rubbery polymer content of said rubber-modified styrene copolymer is from about 2 to about 30 wt %.

6. The rubber modified styrene copolymer of claim 1, wherein said block copolymer constitutes at least about 50 wt % of said rubbery polymer.

7. The rubber-modified styrene copolymer of claim 6, wherein said block copolymer constitute at least about 70 wt % of said rubbery polymer.

8. The rubber-modified styrene copolymer of claim 1, wherein the content of said monomer of styrene or its derivatives of said block copolymer is from about 3 to about 10 wt %.

9. The rubber-modified styrene copolymer of claim 1, wherein the styrene-insoluble content of said rubbery polymer at 25° C. is no greater than about 0.5 wt %.

10. The rubber-modified styrene copolymer of claim 9, wherein the styrene-insoluble content of said rubbery polymer at 25° C. is no greater than about 0.5 wt %.

11. The rubber-modified styrene copolymer of claim 1, wherein the viscosity of said rubbery polymer is from about 5 to about 50 centistokes as measured at 25° C. in the form of a 5 wt % styrene solution.

12. The rubber-modified styrene copolymer of claim 11, wherein the viscosity of said rubbery polymer is from about 8 to about 40 centistokes as measured at 25° C. in the form of a 5 wt % styrene solution.

13. The rubber-modified styrene copolymer of claim 1, wherein said polymer block comprising at least one monomer of butadiene or its derivatives is prepared by copolymerizing less than about 10 parts by weight of a monomer of styrene or its derivatives per about 100 parts by weight of said polymer block comprising at least one monomer of butadiene or its derivatives.

14. The rubber-modified styrene copolymer of claim 13, wherein said polymer block comprising at least one monomer of butadiene or its derivatives is prepared by copolymerizing less than about 5 parts by weight of a monomer of styrene or its derivatives per about 100 parts by weight of said polymer block comprising at least one monomer of butadiene or its derivatives.

15. The rubber-modified styrene copolymer of claim 1, wherein said polymer block comprising at least one monomer of styrene or its derivatives is prepared by copolymerizing less than about 10 parts by weight of a monomer of butadiene or its derivatives per about 100 parts by weight of said polymer block comprising at least one monomer of styrene or its derivatives.

16. The rubber-modified styrene copolymer of claim 1, wherein said copolymer occlusion and graft index is from about 25 to about 150%.

17. The rubber-modified styrene copolymer of claim 16, wherein said copolymer occlusion and graft index is from about 25 to about 80%.

18. The rubber-modified styrene copolymer of claim 1, wherein the average molecular weight of said continuous phase of said copolymer of monomer of styrene or its derivatives and monomer of acrylonitrile or its derivatives is represented by a reduced viscosity of from about 0.5 to about 1.0 dl/gr.

19. The rubber-modified styrene copolymer of claim 18, wherein said average molecular weight is represented by a reduced viscosity of from about 0.6 to about 0.85 dl/gr.

20. The rubber-modified styrene copolymer of claim 1, wherein the molecular weight distribution index of the copolymer in the continuous phase is from about 2.3 to about 2.8.

21. The rubber-modified styrene copolymer of claim 1, wherein the average particle size of said rubbery polymer particles in said dispersed phases is in the range of from about 0.1 to about 3.0 μm.

22. The rubber-modified styrene copolymer of claim 21, wherein the average size of the rubbery polymer particles is in the range of from about 0.23 to about 1.1 μm.

23. The rubber-modified styrene copolymer of claim 1, wherein the crosslinking index of said rubbery polymer particles forming said dispersed phases is from about 4 to about 15 times.

24. The rubber-modified styrene copolymer of claim 23, wherein said crosslinking index is from about 7 to about 12 times.

25. The rubber-modified styrene copolymer of claim 1, wherein said monomer of styrene or its derivatives is selected from the group consisting of styrene, α-methyl styrene, α-ethyl styrene, monochlorostyrene, dichlorostyrene, vinyltoluene, vinylxylene, o-t-butylstyrene, p-t-butylstyrene, p-methylstyrene, tribromostyrene, tetrabromostyrene, p-hydroxystyrene, and o-methoxystyrene.

26. The rubber-modified styrene copolymer of claim 1, wherein said monomer of acrylonitrile or its derivatives is selected from the group consisting of acrylonitrile, methacrylonitrile, fumaronitrile, maleonitrile and α-chloroacrylonitrile.

27. The rubber-modified styrene copolymer of claim 1, wherein from about 1 to about 30 wt % of the total amount of said monomer of styrene or its derivatives and said monomer of acrylonitrile or its derivatives are replaced with a monomer of maleimide or n-phenylmaleimide.

28. The rubber-modified styrene copolymer of claim 27, wherein said maleimide or n-phenyl-maleimide monomer is replaced with at least monomer selected from the group consisting of one methacrylic ester monomers, acrylic ester monomers and maleimide monomers.

29. The rubber-modified styrene copolymer claimed in claim 27, wherein from about 5 to about 17 wt % of the total amount of said monomer of styrene or its derivatives and said monomer of acrylonitrile or its derivatives are replaced with a monomer of maleimide or n-phenylmaleimide.

30. The rubber-modified styrene copolymer of claim 1, wherein the weight ratio of monomer of styrene or its derivatives to monomer of acrylonitrile or its derivatives of the copolymer in the continuous phase is from about 95/5 to about 55/45.

31. The rubber-modified styrene copolymer of claim 1, wherein the proportion of the copolymers in the continuous phase whose molecular weight exceed 1,200,000 is less than about 10 wt %.

* * * * *

UNITED STATES PATENT AND TRADEMARK OFFICE
CERTIFICATE OF CORRECTION

PATENT NO. : 5,191,023
DATED : March 2, 1993
INVENTOR(S) : Iwamoto et al.

It is certified that error appears in the above-identified patent and that said Letters Patent is hereby corrected as shown below:

Column 10, line 46 should read --$(BDB-STB)_m-P$--

Column 10, line 54, amend "$(BDB-STB_m P)$" to --$(BDB-STB)_m P$--.

Column 12, line 68, amend "n-phenyl-maleimide" to --n-phenylmaleimide--.

Signed and Sealed this

Twenty-second Day of February, 1994

Attest:

BRUCE LEHMAN

*Attesting Officer*     *Commissioner of Patents and Trademarks*